United States Patent
Bongaerts et al.

(10) Patent No.: US 6,261,487 B1
(45) Date of Patent: Jul. 17, 2001

(54) METHOD OF AND MACHINE FOR CONTROLLING THE NIP OF THE ROLLS OF A CALENDER AS AN ENDLESS PLANAR WEB IS CONTINUOUSLY PASSED THROUGH THE NIP

(75) Inventors: Horst Bongaerts, Remscheid; Dietmar Jenke, Radevormwald, both of (DE)

(73) Assignee: Brunckner Maschinenbau GmbH, Siegsdorf (DE)

( * ) Notice: Subject to any disclaimer, the term of this patent is extended or adjusted under 35 U.S.C. 154(b) by 0 days.

(21) Appl. No.: 09/142,435

(22) PCT Filed: Mar. 13, 1997

(86) PCT No.: PCT/EP97/01270

§ 371 Date: Sep. 9, 1998

§ 102(e) Date: Sep. 9, 1998

(87) PCT Pub. No.: WO97/34754

PCT Pub. Date: Sep. 25, 1997

(30) Foreign Application Priority Data

Mar. 16, 1996 (DE) .............................................. 196 10 445

(51) Int. Cl.[7] .......................... B29C 43/24; B29C 43/46; B29C 43/58
(52) U.S. Cl. ........................ 264/40.5; 264/40.1; 264/175; 264/280; 264/314; 264/40.6; 425/368; 425/389; 425/140; 425/141; 425/143; 425/149; 492/4; 492/9; 492/10
(58) Field of Search ................................ 264/40.1, 40.5, 264/555, 175, 280, 314, 40.6; 425/363, 368, 389, 140, 141, 143, 149; 492/4, 9, 10

(56) References Cited

U.S. PATENT DOCUMENTS

| | | | |
|---|---|---|---|
| 3,599,288 | * 8/1971 | Eakman | 425/141 |
| 3,649,726 | * 3/1972 | Knowles | 425/141 |
| 3,662,821 | * 5/1972 | Saxon | 165/89 |
| 4,074,624 | * 2/1978 | Biornstad et al. | 100/35 |
| 4,233,011 | * 11/1980 | Bolender et al. | 425/143 |
| 4,607,420 | * 8/1986 | Vomhoff | 492/7 |
| 4,757,582 | * 7/1988 | Verkasalo | 29/116.2 |
| 4,823,450 | 4/1989 | Ramisch | 29/116.2 |
| 5,141,681 | * 8/1992 | Ramm | 264/40.1 |
| 5,295,803 | * 3/1994 | Ogawa et al. | 425/141 |
| 5,464,577 | * 11/1995 | Leonard et al. | 264/40.5 |
| 5,484,370 | 1/1996 | Jenke | 492/4 |
| 5,562,027 | * 10/1996 | Moore | 100/35 |
| 5,662,572 | * 9/1997 | Zaoralek | 492/20 |

FOREIGN PATENT DOCUMENTS

| | | |
|---|---|---|
| 24 37 241 | 2/1976 | (DE) . |
| 28 15 892 | 9/1979 | (DE) . |
| 33 04 076 | 8/1985 | (DE) . |
| 35 31 005 | 3/1986 | (DE) . |
| 44 18 549 A1 | 12/1994 | (DE) . |
| 0 165 750 | 12/1985 | (EP) . |
| 0 429 385 | 5/1991 | (EP) . |
| 2 145 194 | 3/1985 | (GB) . |

* cited by examiner

*Primary Examiner*—Jill L. Heitbrink
*Assistant Examiner*—Michael I. Poe
(74) *Attorney, Agent, or Firm*—Nixon & Vanderhye

(57) ABSTRACT

In order to control and optimize, without stopping production, bowing in the outer wall of a calender roll in which bowing is produced by the action of pressure on an incompressible liquid enclosed in the roll, the invention proposes that, based on error signals generated from continuous thickness measurements and from at least one other quality characteristic, the temperature of the liquid is controlled and the nip modified to correct for deviations from the correct thickness.

20 Claims, 3 Drawing Sheets

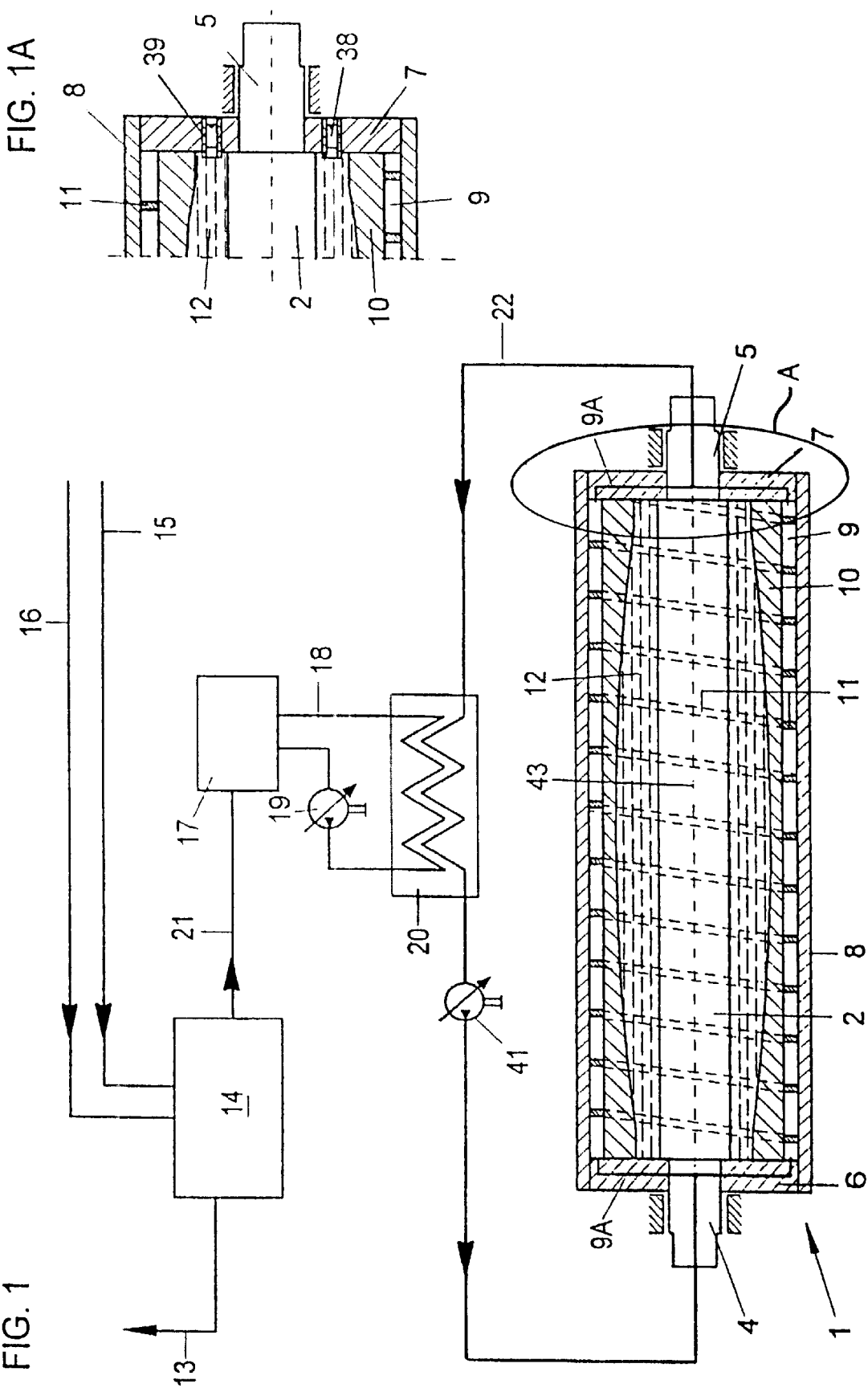

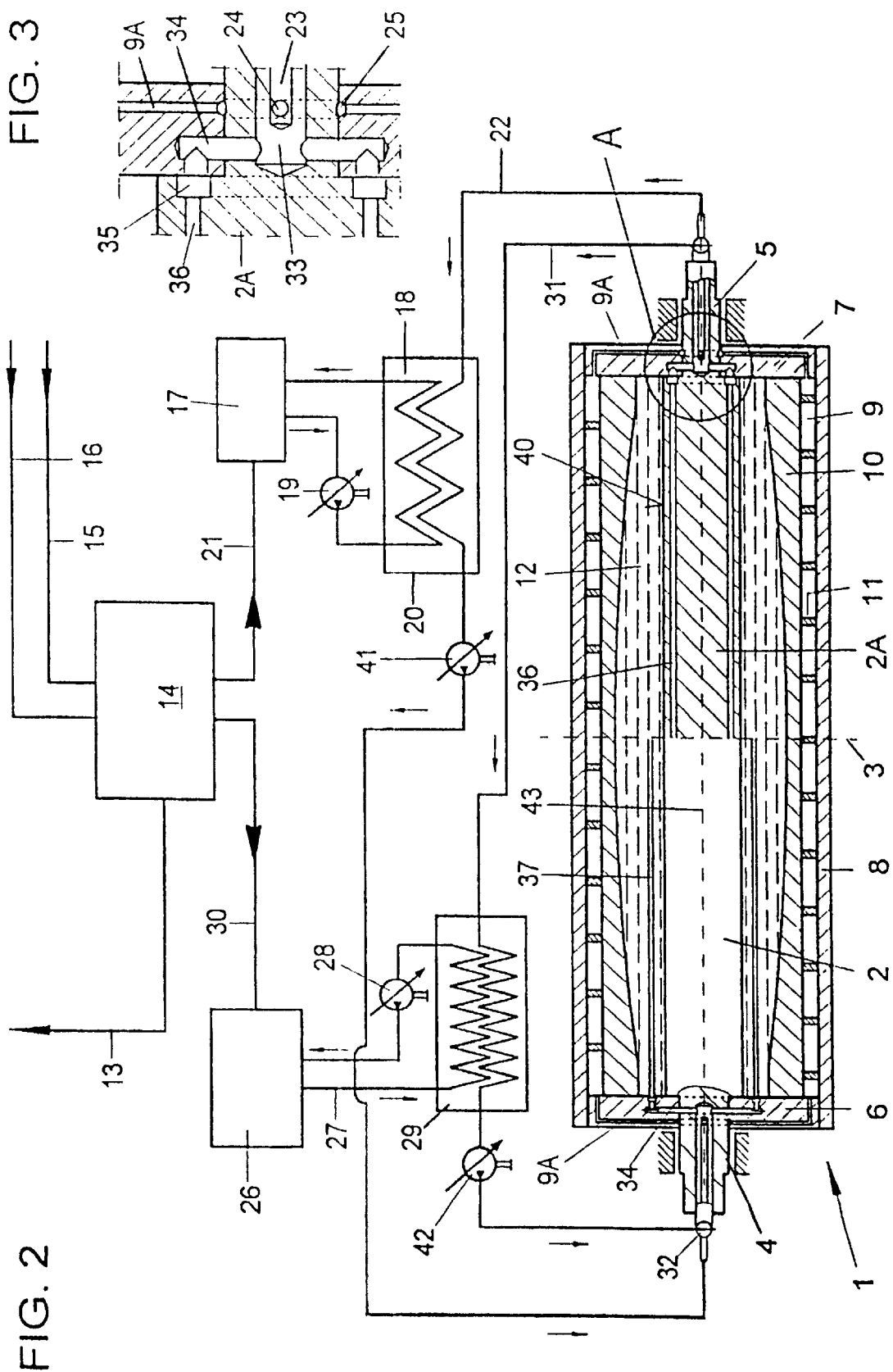

METHOD OF AND MACHINE FOR CONTROLLING THE NIP OF THE ROLLS OF A CALENDER AS AN ENDLESS PLANAR WEB IS CONTINUOUSLY PASSED THROUGH THE NIP

BACKGROUND AND SUMMARY OF THE INVENTION

The invention relates to a method of influencing a calender nip in a plant for producing and/or processing an endless, planar sheet-like structure, and to a rotatably mounted roll for implementing this method.

A calender roll of this type is disclosed by DE 44 18 549 A1.

In two-roll and multi-roll systems, cambered rolls are used to compensate for the sag of conventional, cylindrical rolls along the nip and to achieve a uniform pressure distribution over the length of the nip. In this case, the extent of the convexity, also known as the camber, of the roll jacket over the roll length is usually calculated and implemented for a loading case that is defined by specific parameters. It therefore also leads to optimum results only in the case of a use corresponding to the loading case on which the calculation was based, and therefore, in the case of changed conditions, it would have to be possible for this convexity to be matched to these conditions. However, cambered rolls are often solid-core rolls whose jacket is produced, in a complicated process, with the convexity that is defined in accordance with the basic conditions. In the case of such rolls, subsequent adaptation to changed operating conditions is not possible.

Of the various proposals for compensating for the roll sag as a result of the loading in the nip, most were either of limited success or very complicated and were therefore not able to be fully accepted.

The invention is based on DE 44 18 549 A1 cited at the beginning. This document describes a roll, in particular a calender roll, in which the convexity of the roll jacket is set in a deliberate way and, without dismantling the roll, can be adapted to changed operating parameters when at a standstill. For this purpose, the roll is an externally cylindrical hollow body which is welded in a pressure-tight manner between two end disks and is filled with an incompressible medium. In order to produce the convexity, the incompressible medium is put under pressure. For this purpose, closure plugs are provided in both end disks, and are adjustable axially in their guides with the effect of increasing or decreasing the pressure. Although in the case of the known roll such an adjustment in order to change the extent of the convexity can be carried out finely and without dismantling the roll, it is possible only during a machine stop. It is necessary in order to set a pressure distribution that is uniform over the length of the nip and in order to achieve a thickness that is uniform over the width of the planar sheet-like structure. Planar sheet-like structures in the sense of this invention are, so to speak, endless webs made of elastomeric or thermoplastic polymers or webs that are coated with or laminated to such polymers, such as film webs, textile webs or paper webs.

In order to be able to influence the course of the film thickness over the width of the film web during operation, it is known, as described, for example, in DE 35 31 005 C2, to use the machine control system to change the exit geometry of the injection mould as a function of error signals from a thickness measuring system which, continuously or at intervals, samples the film thickness over the width of the film web, with the effect of compensating for the ascertained thickness deviations. However, thickness fluctuations which originate from deviations in the nip width between the calender rolls cannot be prevented in this way.

Given the prior art outlined, the invention is based on the technical object of making it possible to influence and to optimize the nip, which changes under load, in order to achieve a course of the thickness of the extruded sheet-like structure that is uniform over the web width, even during operation.

The invention provides the possibility—for example while maintaining the abovementioned control of the width of the slot-die tool—to make changes to the pressure in the incompressible fluid that produces the convexity (camber) of the roll jacket, and hence fine readjustment of the nip geometry at any time, even during the continuous production or processing of the sheet-like structure. In this case, raising or lowering the pressure in the liquid in order to influence the convexity of the roll jacket is carried out directly or indirectly by raising or lowering the temperature of the hydraulic fluid. This procedure is surprising in the simplicity of its execution, since no relatively great design problems, such as leaks at shaft bushings for a fluid under high pressure, have to be solved.

The temperature control fluid, which is pumped and circulated through the annular space between roll jacket and working face of the roll, is controlled in terms of its temperature and, as a result, the temperature of the fluid which effects the cambering of the roll jacket and is enclosed in the pressure space is raised or lowered. This way of influencing the nip is very effective and beneficial since, in the event of the calender roll being constructed in design terms as a cooling roll, this only needs to be further equipped with suitable sensors and the heating/cooling circuit to be included in a control system which is guided by the machine control system.

In the case of a preferred refinement of the method, the raising or lowering of the temperature of the fluid effecting the cambering is carried out as a function of the thickness of the web, measured continuously or at intervals, including the haul-off speed of the ascertained basis weight and, preferably, at least one further quality feature. The quality feature may be a measured value identifying the surface finish, which is registered by a sensor and fed to the machine control system, where it is compared with stored desired values in order, in the event of impermissible deviations, to derive, in particular, empirically ascertained actuating value changes. Further quality features, which can be registered by suitable sensors, are the stress on the web in the nip, in order to prevent overcalendering of the web, with work markings occurring, or undercalendering of the web as a result of air entrainment because of an excessively wide nip. The pressure prevailing in the nip, or the nip loading, can be ascertained by means of load cells, in order to effect the necessary correction by optimizing the camber of the calender roll. Optical sensors, which operate using polarized light, for example, can finally be used to register mechanical stresses and to provide measured values, which are processed in the machine control system and, in conjunction with the adjustment to the nip, increase the quality of the produced and/or processed product web by optimizing the camber of the roll.

In the case of a further refinement of the method, the ascertained thickness deviations in the product web can be corrected in that the change to the pressure in the incompressible hydraulic fluid by means of temperature control, and the die gap adjustment—as already mentioned above—are combined with each other.

In a refinement of the method, a separate heating/cooling-medium circuit led through the hydraulic fluid is provided in order to change the hydraulic fluid temperature.

In order to be able to correct even thickness deviations occurring locally or outside the central region of the roll by means of deliberate temperature changes in the hydraulic fluid, in the case of a further embodiment, the roll is subdivided over its length into at least two, better at least three, adjoining axial regions, in which the control of the pressure of the respective hydraulic fluid can be carried out independently of the adjacent region.

A preferred device for implementing the novel method results from the development of the roll described in DE 44 18 549 A1. In the case of this roll, the roll jacket of the roll exhibiting the convexity is surrounded concentrically at a distance by a working face of circular ring shape. This is supported on the jacket face by a web fitted on the outer face of the roll jacket. In the case of the known roll, the annular space between the jacket face and the working face, in particular the helical channel formed between the supporting webs, is used to cool the working face, which is heated up by the contact with the product web, for example film web. For this purpose, it is connected to a circulating system for a heating or cooling fluid, which keeps the flow temperature of the heating or cooling fluid to a constant, preset value. The fine regulation of the course of the thickness of the product web over its width is carried out, in the case of the known device, by regulating the nip cross section of the slot die producing the web, specifically as a function of error signals which arise during the continuous measurement of the thickness of the product web over its web width.

It has now been found that a freshly produced film web, when it reaches the calender nip, has already cooled down to such an extent that slight changes to the cooling temperature of the calender roll, these changes being sufficient to achieve the novel pressure change in the incompressible fluid, do not have a severe influence on the quality of the product. Therefore, according to the invention the circulating system that is present in the case of the generic roll for the heating or cooling fluid flowing through the annular space is supplemented by a regulating system by means of which the flow temperature of the heating or cooling fluid flowing through the annular space is set. Regulation is carried out as a function of error signals from the thickness measurement, in conjunction with a quality feature, with the effect of eliminating the thickness deviations by optimizing the camber of the roll jacket.

A further embodiment relates to a roll in a plant which differs from the roll previously described in that the roll jacket which has the convexity is the working face. This means that the annular space is missing here, and therefore so are the circulating system for the heating or cooling fluid flowing through the annular space, in particular the helical channel. In this case, the invention provides for the roll to be equipped with a heating- or cooling-medium circuit, which is used to control the temperature of the incompressible pressure medium, and comprises a heater/cooler, a heat exchanger, a controlled system for controlling the flow temperature of the heating/cooling fluid, and heat-transfer surfaces, by means of which the temperature of the fluid effecting the cambering of the roll can be raised or lowered.

In this case, the heat-transfer surfaces for controlling the temperature of the incompressible pressure medium may be pipes, which are distributed with a radial spacing from the roll axis and end in a pressure-tight manner in the end disks or abut the latter. They run within the cavity in the roll jacket which contains the pressure medium.

In the case of another refinement of the novel roll which is equipped with a roll core that is inserted in a pressure-tight manner into the hollow body of the roll, and whose axial end regions form the bearing journals and in each case reach beyond the axial end disks, it is possible for the heat-transfer surfaces to be constructed in a manner similar to the embodiment previously described. However, in a solution that is modified in design terms, they may also be longitudinal bores which are distributed evenly over the circumference of the roll core, are axially parallel and are arranged at a small distance below the outer face of the roll core.

In order to be able to correct even thickness errors which occur asymmetrically over the width of a product web, in particular a film web, in the case of a development, in particular of the roll surrounded by a cooling jacket, provision is made to subdivide the annular space of the roll jacket and the pressure-medium chamber in the axial direction into a plurality of chambers and to connect them together in pairs, the pairs being connected to respectively associated heat exchangers by associated supply lines.

BRIEF DESCRIPTION OF THE DRAWING FIGURES

The invention will be explained with reference to an exemplary embodiment that is illustrated in the appended drawing, in which:

FIG. 1 shows an embodiment of a novel roll having a roll core and helical channel for a temperature control fluid circulation;

FIG. 1A shows a design detail of the embodiment according to FIG. 1 indicated within circle A;

FIG. 2 shows an embodiment having a circulation system each for the roll cooling and for influencing the pressure in the incompressible pressure medium;

FIG. 3 shows a detail designated A in FIG. 2 with an illustration of the connections between those parts of the circulation systems which run outside the roll and those which run inside the roll construction.

DETAILED DESCRIPTION OF A PREFERRED EMBODIMENT

Figure 4:
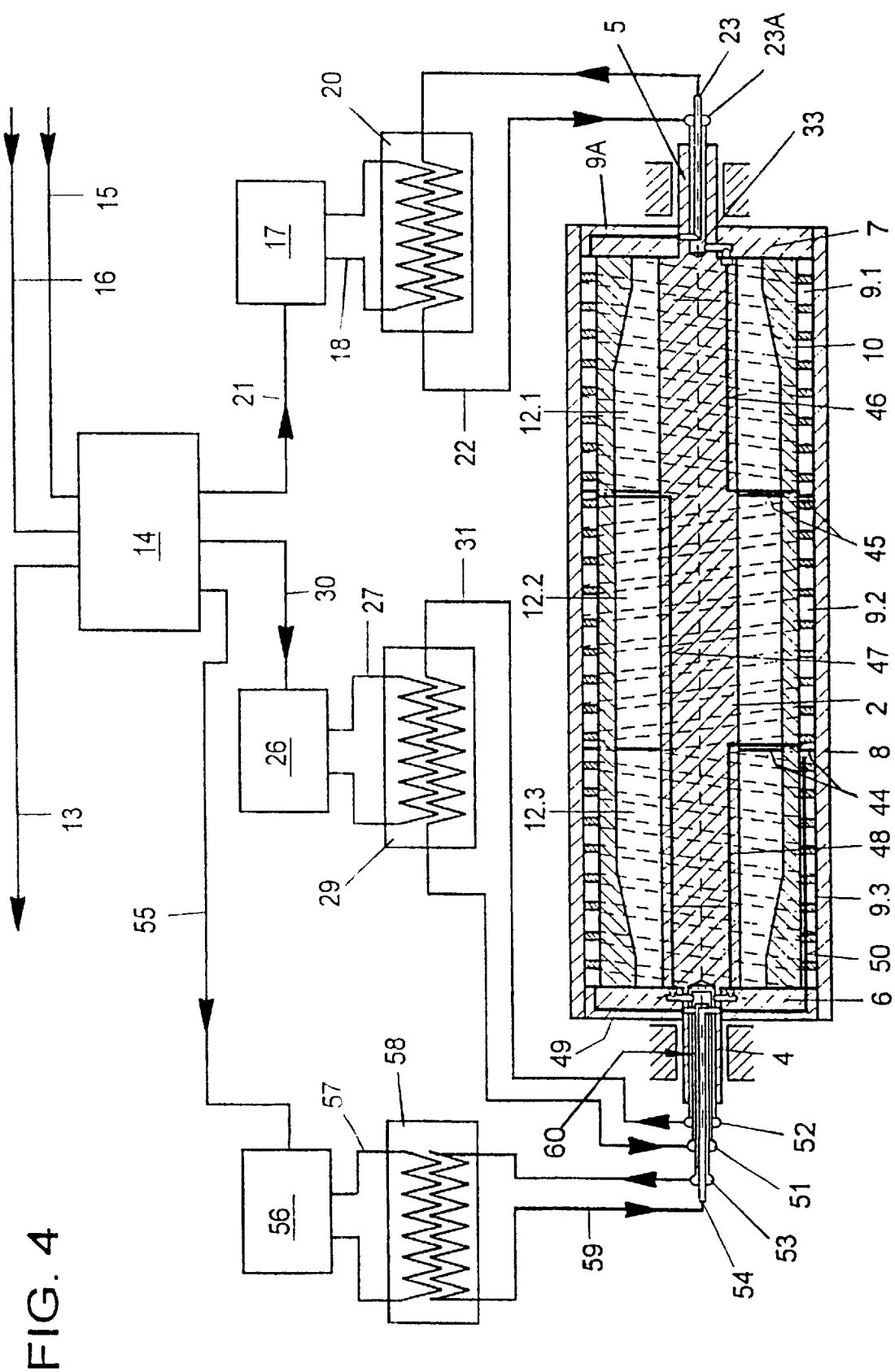
FIG. 4 shows an embodiment of the roll similar to FIG. 1, but with a helical chamber and pressure-medium chamber in each case subdivided into three longitudinal sections.

Essential parts of the roll 1 in illustrated in FIG. 1 correspond to one of the embodiments, described in DE 44 18 549 A1 mentioned at the beginning, of a temperature-controllable roll whose camber can be varied. Thus, the roll has two end disks 6, 7, between which a hollow body forming the roll jacket 10 is welded in a pressure-tight manner. A roll core 2 is inserted in a pressure-tight manner into the hollow body in such a way that its end regions which form the bearing journals 4, 5, extend beyond the end disks 6, 7 through bores in the latter. Provided around the roll jacket 10 is a circularly cylindrical working face 8, which is concentric with the latter and on both sides engages over the edges of the end disks 6, 7. It rests on a helical web 11, which for its part is supported on the outer face of the roll jacket 10, and is provided in a cavity 9, which has a cross section of circular ring shape, between the working face 8 and the roll jacket 10.

The interspace between the roll core 2 and the hollow body is filled with an incompressible pressure medium 12 which, in order to produce a convexity (camber), which is predefined in terms of its magnitude, of the roll jacket 10, is placed under a correspondingly predefined pressure. The precautions which are disclosed by DE 44 18 549 A1 and are also applicable in the case of the roll 1 are illustrated in FIG. 1A in order to preserve the clarity of the drawing.

A plurality of bushes 39 are preferably inserted in a pressure-tight manner into the end disks 6, 7. The bushes 39 are provided with internal threads into which closure plugs 38 are inserted. By screwing the closure plugs 38 in or out, it is also possible to change the convexity of the roll jacket 10 finely with the internal pressure. However, this can be done only when the roll is at a standstill. However, it has been shown that there is also a need to carry out optimization of the camber of the roll cover during the operation of a calender having at least one such roll, particularly if changes to the process parameters are caused by ambient influences.

In the case of the embodiment of the invention shown in FIG. 1, readjustment of the camber of the roll jacket 10 and of the working face is achieved by replacing the cooler, provided in DE 44 18 549 A1, in the circuit for the circulating heat-transfer medium by a heating/cooling unit 17, whose function is guided by control or regulating signals from the machine control system 14 that is connected to the unit 17 via a control line 21. The machine control system 14 is for its part supplied with signals via signal lines 15 and 16. In this case, the line 15 is connected to a device which is not illustrated but belongs to the prior art for the continuous measurement of the film thickness, of the basis weight of the film web or of another quality feature. On the other hand, the line 16 is connected to a pressure sensor for monitoring the pressure or to a thermocouple for indicating the current temperature (both likewise not illustrated) in the incompressible pressure medium 12. In the event of extending the machine control system, it is also possible to provide further measuring lines which supply relevant measured values, which are compared in the machine control system 14 with desired value profiles that are stored there, and from which, in the event of impermissible deviations, control signals for the die gap adjustment and the heating/cooling unit 17 are derived. A circulating pump 19 in the primary circuit 18 and a pump 41 in the secondary circuit 22, which comprises the helical channel in the cavity 9 and the radial feed lines 9A provided in the end disks 6, 7, in each case ensure a flow which is uniform but, if appropriate, is also tailored to the demand (volume flow regulation) and depends on the regulating signals, in the primary and in the secondary circuit. The primary and secondary circuits are functionally connected to each other by a common heat exchanger 20.

Also connected to the machine control system 14 is a control line 13 to a slot die (not illustrated), by means of which line the actuating elements for setting the die gap—as is known per se in the prior art (e.g. DE 35 31 005 C)—can be actuated.

FIGS. 2 and 3 show further embodiments of the roll 1 with adjustable cambering of the roll jacket, in which, in order to implement the pressure control of the incompressible pressure medium 12, a separate heating- or cooling-medium circuit 26 to 36 or 26 to 35 and 37 is provided, while the cooling circuit 9, 17 to 22 disclosed by DE 44 18 549 A1 is retained.

FIG. 2 shows two variants of the novel roll 1, in which a circuit that is supplemented by a second heating/cooling circuit passes axially through a roll core 2, the end disks 6, 7 and the end regions forming the bearing journals 4, 5. In the case of both variants, direct control of the temperature of the pressure medium 12 is provided. In the embodiment of the right-hand half of FIG. 2, the roll core 2 has axially parallel bores 36, which are provided in the roll core 2 distributed over its circumference at a short radial spacing from its circumferential face 40 and reach at least over the length of the roll jacket 10, whereas in the embodiment illustrated to the left of the dividing line 3, axially parallel pipes 37 are provided outside the roll core 2 at a small radial spacing from the circumferential face 40, the pipes ending in or on the end disks 6, 7 and being connected in a pressure-tight manner to the end disks.

The bores 36 or the pipes 37 are connected to the heating/cooling circuit 26 to 36 or 26 to 35 and 37, respectively, via the bearing journals 4, 5, as illustrated in FIG. 3. The helical channel formed between the webs 9 is connected to the first heating/cooling circuit via radial connections 9A. They are connected via the spur ducts 24, leading to the annular ducts 25, to the pipe sections 23 which are provided in the bearing journals 4, 5 and are connected to the line 22. In addition, blind bores 33, which are connected to the line 31 of the heating/cooling circuit 26 to 36 or 26 to 35 and 37, are provided in the bearing journals 4, 5. From the bores 33, radial ducts 34 lead to the annular ducts 35, into which the axial bores 36 provided in the roll core 2 open or (see the left-hand half of FIG. 2) to which the axially running pipes 37 are connected in a pressure-tight manner. Although both solutions are more complicated than the embodiment of FIG. 1, as a result of the additional heating/cooling circuit for the direct temperature/pressure control of the enclosed pressure medium, they have the advantage that, because of the significantly shorter paths for the heat transfer, significantly faster reactions of the temperature and hence of the pressure in the incompressible pressure medium 12 take place if the machine control system 14 carries out corrections to the nip as a result of readjusting the camber of the roll jacket.

Finally, FIG. 4 shows a development of the roll shown in FIG. 1, in which there is also the possibility of correcting thickness fluctuations that occur asymmetrically, that is to say off-center, in a deliberate way by influencing the roll nip. For this purpose, in the case of the embodiment illustrated the cavity 9 and the chamber enclosing the pressure medium 12 are in each case subdivided by common radial dividing walls 44, 45 into there axial sections 9.1, 9.2, 9.3 and 12.1, 12.2, 12.3. Each pair of chambers 9.1, 12.1; 9.2, 12.2 and 9.3, 12.3 is connected to its own heating/cooling circuit 17 to 23, 26 to 31, 51, 52 and 53 to 59; the circulating pumps illustrated in FIG. 2 are not shown in FIG. 4 for reasons of simplicity. The temperature control devices 17, 26 and 56 are in each case controlled individually by the central machine control system 14 as a function of the error signals which are supplied via the signal lines 15 by the sensors for the basis weight, the quality features, the pressure in the nip etc.

The supply of the respective temperature control medium to the three pairs of chambers 9.1, 12.1; 9.2, 12.2 and 9.3, 12.3 is carried out via the two bearing journals 4 and 5; reference should be made expressly to the fact that, in particular, the illustrations in FIG. 4 which relate to the temperature control circuits and the line bushes, which are identified by the reference number 60, are schematic; they should serve merely as explanation and cannot be applied as design instructions.

In the case of the embodiment illustrated, it can be seen in each case that the result is the circuits 22-23-9A-9.1-46-33-22, 31-51-47-9.2-48-52 and 59-53-49-9.3-50-54-59. The line 50 of the last circuit, just like the line 49, is led in the end disk 6 as far as the cavity 9.3, the line 50 ending in the cavity 9.3 before the dividing wall 44, while the lines 46 to 48 run as far as the respective roll sections as bores in the roll core 2, and are led radially from there to the pairs of chambers 9.1, 12.1 and 9.2, 12.2.

In order to preserve clarity, the illustration of the closure plugs 38 and the associated threaded bushes 39 (FIG. 1A) in the end disks 6, 7 has also been omitted. A possibility of setting the pressure in the central chamber is likewise not illustrated. Although an arrangement of closure plugs 38 and threaded bushes 39 of the type illustrated in FIG. 1A is not possible in the case of this central chamber, it is possible to set the pressure, for example likewise by means of a channel in the roll core 2 that is led to the central pressure medium chamber 12.2 and can be closed in a similar way.

LIST OF REFERENCE SYMBOLS

1 Roll, calender roll
2 Roll core, core
3 Dividing line
4 Bearing journal
5 Bearing journal
6 End disk
7 End disk
8 Outer jacket, working face
9 Cavity, annular space, helical channel
10 Hollow body, roll jacket
11 Web, helix, helical web
12 Hydraulic fluid, pressure medium
12.1–12.3 Pressure-medium chamber
13 Control line
14 Machine control system
15 Signal line
16 Signal line
17 Cooler, temperature control device
18 Line
19 Pump, circulating pump
20 Heat exchanger
21 Control line
22 Line
23 Connection, cooling fluid connection
24 Radial duct
25 Annular duct
26 Temperature control device
27 Line
28 Pump, circulating pump
29 Heat exchanger
30 Control line
31 Line
32 Connection
33 Distributor
34 Radial duct
35 Distributor chamber, annular duct
36 Temperature control bore
37 Temperature control pipe
38 Closure plug
39 Bush
40 Outer face of the roll core
41 Pump, circulating pump
42 Pump, circulating pump
43 Axis, roll axis
44 Dividing wall
45 Dividing wall
46 Line
47 Line
48 Line
49 Line
50 Line
51 Connection
52 Connection
53 Connection
54 Connection
55 Control line
56 Temperature control device
57 Line
58 Heat exchanger
59 Line
60 Line bushes

What is claimed is:

1. A method of changing a camber of one roll of two rolls forming a nip therebetween in a plant for producing and/or processing an endless planar web continuously passed through the nip and wherein the nip changes under load, comprising the steps of:

applying pressure to an interior of the one roll using a pressurized incompressible fluid contained in and completely filling an annular chamber in and about the one roll;

controlling the nip between the two rolls by controlling a pressure of the pressurized incompressible fluid in the annular chamber to change the camber of the one roll by indirectly adjusting a temperature of the pressurized incompressible fluid as the endless planar web continuously passes through the nip; and controlling the pressure of the pressurized incompressible fluid in the annular chamber by flowing a control fluid in a heating/cooling control fluid circuit through the one roll in heat exchange relation with the pressurized incompressible fluid and by adjusting a temperature of the control fluid flowing through the one roll in response to a deviation of a measured thickness of the endless planar web over its width from a predetermined thickness to thereby indirectly adjust the temperature of the pressurized incompressible fluid.

2. A method according to claim 1 wherein the step of controlling the nip includes optically sensing stresses in the web and generating a measured stress value in response thereto, and adjusting the temperature of the flowing control fluid in response to a comparison of the measured stress value and a desired stress value to change the camber of the one roll.

3. A method according to claim 1 including setting a nip width in accordance with a predefined thickness of the web, sensing a deviation in a thickness of the web during production and/or processing of the web from the predefined thickness, and correcting the nip width in response to the sensed deviation by adjusting the temperature of the flowing control fluid to change the camber of the one roll.

4. A method according to claim 3 including extruding the web from a die gap of a slot die and correcting deviations in the thickness of the web by adjusting the die gap in the slot die.

5. A method according to claim 1 including providing a heat exchanger through which the control fluid is passed to adjust the control fluid temperature.

6. A method according to claim 5 including subdividing the one roll over its axial length into at least two adjoining regions, providing a heating/cooling control fluid circuit for each region and separately adjusting the temperature of the control fluid flowing in each region.

7. A method according to claim 1 including continuously measuring the thickness of the web over the width of the web and controlling the nip includes adjusting the temperature of the flowing control fluid in response to the measured thickness of the web and at least one further parameter of the web to change the camber of the one roll.

8. A method according to claim 7 wherein the further parameter includes a measured value of surface finish of the web, and wherein the step of controlling the nip includes measuring the surface finish of the web to obtain a measured value, comparing the measured value and a predefined value of the surface finish and adjusting the temperature of the flowing control fluid in response to a deviation of the measured value from the predefined value to change the camber of the one roll.

9. A method according to claim 7 wherein the further parameter includes a measured value of stress on the web in the nip and wherein the step of controlling the nip includes measuring the stress on the web in the nip to obtain a measured value, comparing the measured value and a predefined value of the stress on the web in the nip and adjusting the temperature of the flowing control fluid in response to a deviation of the measured value from the predefined value to change the camber of the one roll.

10. A method according to claim 9 wherein the step of controlling the nip includes measuring a nip pressure exerted on the web in the nip and adjusting the temperature of the flowing control fluid in response to a deviation of the measured nip pressure from a desired nip pressure defined and stored in a machine control system to change the camber of the one roll.

11. In a plant for producing and/or processing an endless planar structure, a machine comprising:
a calender roll forming a nip with a second roll, the calender roll including two roll journals extending in an axial direction of the calender roll, two end disks, a hollow body between the two end disks forming a pressure-tight roll jacket and defining a chamber containing and completely filled with an incompressible fluid, and a heating or cooling flow circuit for flowing a heating or cooling fluid through the calender roll in heat exchange relation with the incompressible fluid to control the nip between the calender roll and the second roll by controlling a pressure of the incompressible fluid in the chamber to change a camber of the calender roll by indirectly adjusting a temperature of the incompressible fluid in the chamber in the calender roll as the endless planar structure passes through the nip said heating/cooling, the heating or cooling flow circuit comprising a heat exchanger and a control system for adjusting the temperature of the heating or cooling fluid as a function of a deviation of a measured thickness of the endless planar structure over its width from a predetermined thickness thereof to thereby indirectly adjust the temperature of the incompressible fluid in the chamber.

12. A machine according to claim 11 wherein the flow circuit for flowing a heating or cooling medium through the generally annular cavity further comprises pipes extending inside the chamber and spaced radially from an axis of rotation of the calender roll for flowing the heating or cooling medium through the chamber in heat exchange relation to the incompressible fluid in the chamber.

13. A machine according to claim 11 including a roll core within the roll jacket and having axial end regions forming the bearing journals extending axially beyond the two end disks, and the flow circuit for flowing a heating or cooling medium through the generally annular cavity further including pipes spaced radially outwardly of the roll core in the chamber and distributed circumferentially about the roll core for flowing the heating or cooling medium through the chamber in heat exchange relation to the incompressible fluid in the chamber.

14. A machine according to claim 11 including a roll core within the roll jacket and having axial end regions forming the bearing journals extending axially beyond the two end disks, the flow circuit for flowing a heating or cooling medium through the generally annular cavity further including longitudinal bores extending through and distributed circumferentially about the roll core for flowing the heating or cooling medium through the chamber in heat exchange relation to the incompressible fluid in the chamber, and the bores being axially parallel to one another and arranged radially inwardly of an outer face of the roll core.

15. A machine according to claim 11 including a roll core within the roll jacket and having axial end regions forming the bearing journals extending axially beyond the end disks, the chamber containing the incompressible fluid being subdivided in the axial direction into a plurality of pressure spaces, a working face surrounding the roll jacket and defining a plurality of axially spaced annular spaces associated with the plurality of pressure spaces, and separate flow circuits for flowing the heating or cooling medium through each of the annular spaces in heat exchange relation with the incompressible fluid in each of the associated pressure spaces, respectively, each of the separate flow circuits having a discrete heat exchanger for supplying a discrete heating or cooling medium to each of the annular spaces to independently adjust the temperature of the discrete heating or cooling mediums in each of the annular spaces.

16. In a plant for producing and/or processing an endless planar structure, a machine comprising:
a calender roll forming a nip with a second roll, the calender roll including two roll journals extending in an axial direction of the calender roll, two end disks, a hollow body between the two end disks forming a pressure-tight roll jacket and defining a chamber containing and completely filled with an incompressible fluid, a working face of a circular ring shape concentrically surrounding the roll jacket defining a generally annular cavity therebetween, a web in the generally annular cavity between the working face and the roll jacket and fitted to an outer face of the roll jacket, a flow circuit for flowing a heating or cooling medium through the generally annular cavity in heat exchange relation to the incompressible fluid in the chamber to control the nip between the calender roll and the second roll by controlling a pressure of the incompressible fluid in the chamber to change a camber of the calender roll by indirectly adjusting a temperature of the incompressible fluid in the chamber as the endless planar structure passes through the nip, and a control system for adjusting the temperature of the heating or cooling medium flowing through the generally annular cavity as a function of a deviation of the thickness of the endless planar structure over the width thereof from a predetermined thickness of the endless planar structure and as a function of at least one other parameter of the endless planar structure to thereby indirectly adjust the temperature of the incompressible fluid in the chamber.

17. A machine according to claim 16 wherein the flow circuit for flowing a heating or cooling medium through the generally annular cavity further comprises pipes extending inside the chamber and spaced radially from an axis of rotation of the calender roll for flowing the heating or cooling medium through the chamber in heat exchange relation to the incompressible fluid in the chamber.

18. A machine according to claim 16 including a roll core within the roll jacket and having axial end regions forming the bearing journals extending axially beyond the two end disks, and the flow circuit for flowing a heating or cooling medium through the generally annular cavity further including pipes spaced radially outwardly of the roll core in the chamber and distributed circumferentially about the roll core for flowing the heating or cooling medium through the chamber in heat exchange relation to the incompressible fluid in the chamber.

19. A machine according to claim 16 including a roll core within the roll jacket and having axial end regions forming the bearing journals extending axially beyond the two end disks, the flow circuit for flowing a heating or cooling medium through the generally annular cavity further including longitudinal bores extending through and distributed circumferentially about the roll core for flowing the heating or cooling medium through the chamber in heat exchange relation to the incompressible fluid in the chamber, and the bores being axially parallel to one another and arranged radially inwardly of an outer face of the roll core.

20. A machine according to claim 16 including a roll core within the roll jacket and having axial end regions forming the bearing journals extending axially beyond the end disks, the chamber and the generally annular cavity containing the respective incompressible fluid and the heating or cooling medium being subdivided in the axial direction into a plurality of associated pressure spaces and annular spaces, respectively, and separate flow circuits for flowing the heating or cooling medium through each of the annular spaces in heat exchange relation with the incompressible fluid in each of the associated pressure spaces, respectively, each of the separate flow circuits having a discrete heat exchanger for supplying a discrete heating or cooling medium to each of the annular spaces to independently adjust the temperature of the discrete heating or cooling mediums in each of the annular spaces.

* * * * *